United States Patent
Naito et al.

(10) Patent No.: US 8,220,714 B2
(45) Date of Patent: Jul. 17, 2012

(54) SCANNER

(75) Inventors: Hidehiro Naito, Shizuoka (JP); Hitoshi Iizaka, Shizuoka (JP); Yoshiya Yamada, Shizuoka (JP); Hidemi Mihara, Shizuoka (JP); Osamu Tsuchiya, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/961,814

(22) Filed: Dec. 7, 2010

(65) Prior Publication Data

US 2011/0139875 A1    Jun. 16, 2011

(30) Foreign Application Priority Data

Dec. 11, 2009 (JP) ................................ 2009-282079
Jul. 16, 2010 (JP) ................................ 2010-161624

(51) Int. Cl.
     *G06K 7/10*      (2006.01)
(52) U.S. Cl. .............. 235/470; 235/462.11; 235/462.42; 235/462.45
(58) Field of Classification Search .................. 235/470, 235/462.11, 462.42, 462.45
See application file for complete search history.

(56) References Cited

U.S. PATENT DOCUMENTS

| | | | | |
|---|---|---|---|---|
| 2008/0149723 A1* | 6/2008 | Zhu et al. | ................. | 235/462.11 |
| 2009/0072039 A1 | 3/2009 | Yamada et al. | | |
| 2009/0188981 A1 | 7/2009 | Iizaka et al. | | |
| 2009/0192909 A1 | 7/2009 | Iizaka et al. | | |
| 2009/0236424 A1* | 9/2009 | Hennick et al. | .......... | 235/462.11 |
| 2009/0250519 A1 | 10/2009 | Yamada et al. | | |
| 2010/0096461 A1* | 4/2010 | Kotlarsky et al. | ........ | 235/462.11 |

FOREIGN PATENT DOCUMENTS

| | | |
|---|---|---|
| JP | 07-093461 | 4/1995 |
| JP | 11-110470 | 4/1999 |
| JP | 11-353408 | 12/1999 |
| JP | 2004-184639 | 7/2004 |
| JP | 2004-266621 | 9/2004 |
| JP | 2007-334493 | 12/2007 |

OTHER PUBLICATIONS

Japanese Office Action for Japanese Application No. 2010-161624 mailed on Nov. 22, 2011.

* cited by examiner

*Primary Examiner* — Allyson Trail
(74) *Attorney, Agent, or Firm* — Turocy & Watson, LLP

(57) ABSTRACT

A scanner according to an embodiment includes a housing, an imaging device provided in the housing, and a light source. The housing has an imaging window. The imaging window is sectioned by an upper side portion, a lower side portion, and a pair of side portions. The lower side portion is spaced apart from the upper side portion. The pair of side portions connect respective ends of the upper side portion and the lower side portion. The imaging device picks up, via the imaging window, an image of a reading target present in a reading area formed on the outer side of the housing through the imaging window and outputs image data of the reading target. The light source is located on the outer side of the reading area and arranged along each of the side portions of the housing and irradiates illumination light on the reading area.

12 Claims, 3 Drawing Sheets

SCANNER

CROSS-REFERENCE TO RELATED APPLICATIONS

This application is based upon and claims the benefit of priority from Japanese Patent Application No. 2009-282079 filed on Dec. 11, 2009 and Japanese Patent Application No. 2010-161624 filed on Jul. 16, 2010, the entire contents of which are incorporated herein by reference.

FIELD

Embodiments described herein relate generally to a scanner that picks up an image of a code symbol.

BACKGROUND

In the past, as a scanner that reads a code symbol such as a barcode attached to a commodity, there is a vertical scanner used while being fixed to a sucker table or the like in a store (see, for example, JP-A-2007-334493).

As such a scanner, there is a scanner including an imaging device and illuminating devices in a housing. An imaging window is formed in the housing. The imaging device includes an image sensor such as a CCD imaging device. The illuminating devices are arranged in the upper side portion and the lower side portion of the imaging window and emit illumination light to the outer side of the imaging window. In this scanner, reflected light from a code symbol arranged in an imaging area on the outer side of the imaging window is made incident on the inside of the housing through the imaging window and the imaging device receives the incident reflected light.

The scanner is set on a sucker table to locate the imaging window in a position lower than the eyes of an operator facing the imaging window. Consequently, the operator can easily perform scan work for bringing the code symbol close to the imaging window in order to cause the scanner to read the code symbol.

DESCRIPTION OF THE DRAWINGS

FIG. 1 is a perspective view of a scanner according to an embodiment shown together with a sucker table and the like;

DETAILED DESCRIPTION

In the scanner in the past, since the illuminating device arranged in the lower side portion of the imaging window irradiates the illumination light on the imaging area from below, the illumination light of the illuminating device tends to enter the eyes of the operator who faces the imaging window and performs work while looking obliquely front-downward. Therefore, the scanner in the past dazzles the operator.

An embodiment is devised in view of the above and suppresses a scanner from dazzling an operator when an imaging window is arranged in a position lower than the eyes of the operator facing the imaging window.

The scanner according to this embodiment includes a housing, an imaging device provided in the housing, and a light source. The housing has an imaging window. The imaging window is sectioned by an upper side portion, a lower side portion, and a pair of side portions. The lower side portion is spaced apart from the upper side portion. The pair of side portions connect respective ends of the upper side portion and the lower side portion. The imaging device picks up, via the imaging window, an image of a reading target present in a reading area formed on the outer side of the housing through the imaging window and outputs image data of the reading target. The light source is located on the outer side of the reading area and arranged along each of the side portions of the housing and irradiates illumination light on the reading area.

The scanner according to this embodiment is explained in detail below with reference to the accompanying drawings. In the figure, an arrow "a" indicates the up to down direction of the scanner, an arrow "b" indicates the left to right direction (the width direction) of the scanner, and an arrow "c" indicates the front to rear direction of the scanner.

Figure 1:
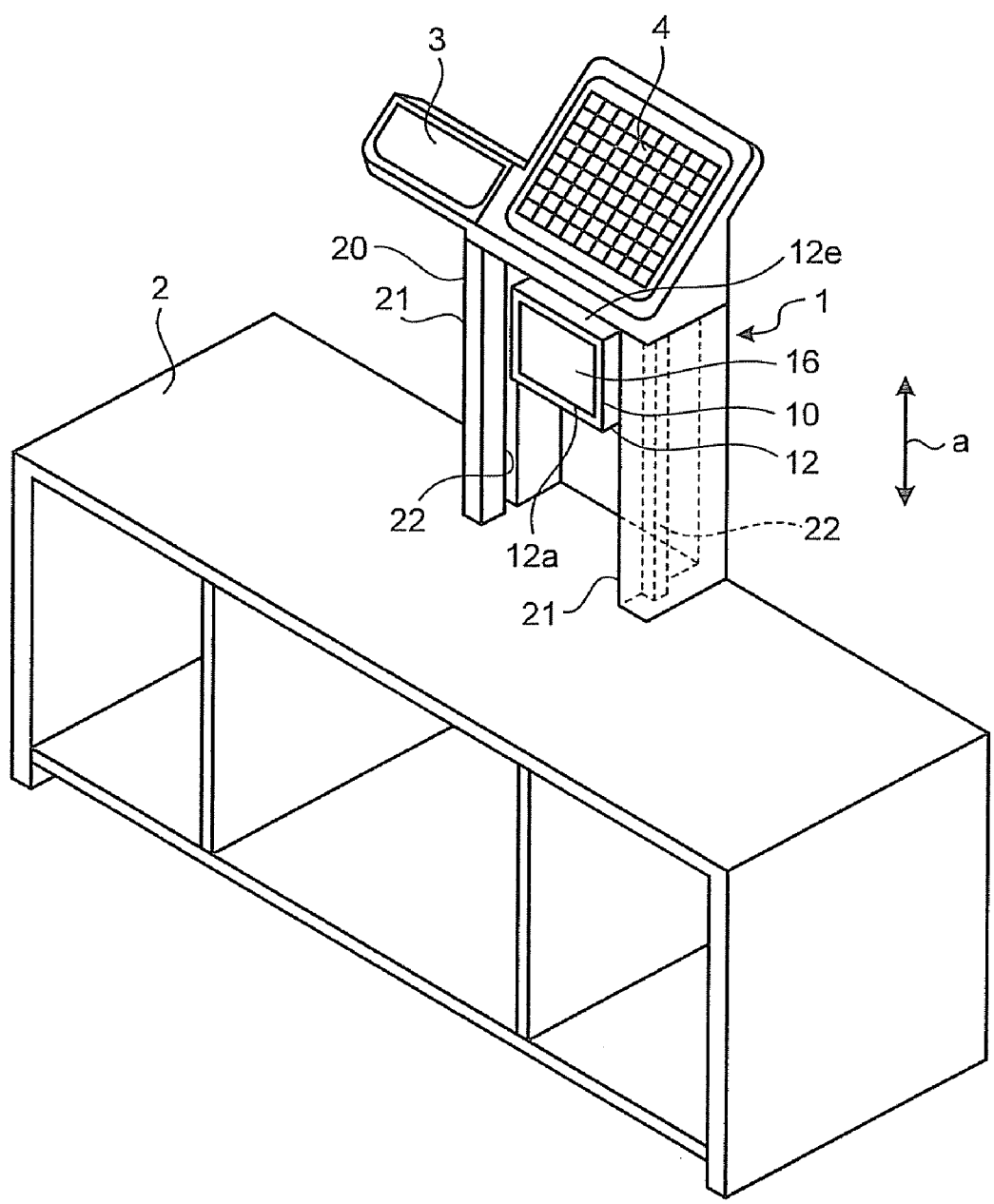

As shown in FIG. 1, a scanner 1 is a vertical scanner. The scanner 1 is vertically provided on a sucker table 2 serving as a setting table. The scanner 1 is set on the sucker table 2 to locate an imaging window 12a in a position lower than the eyes of an operator which faces the imaging window 12a. The sucker table 2 is a table on which a shopping basket or the like is placed. The sucker table 2 is set in a checkout place of a store. A display 3 and a keyboard 4 are disposed in an upper part of the scanner 1.

The scanner 1 includes a scanner main body 10 and a supporting section 20. The supporting section 20 supports the scanner main body 10 to enable adjustment of upper and lower positions of the scanner main body 10.

The supporting section 20 includes a pair of left and right columns 21 vertically provided on the sucker table 2. Guide grooves 22 extending in the up to down direction are provided in sections opposed to each other of the columns 21. The supporting section 20 guides the scanner main body 10 along the guide grooves 22.

Figure 2:
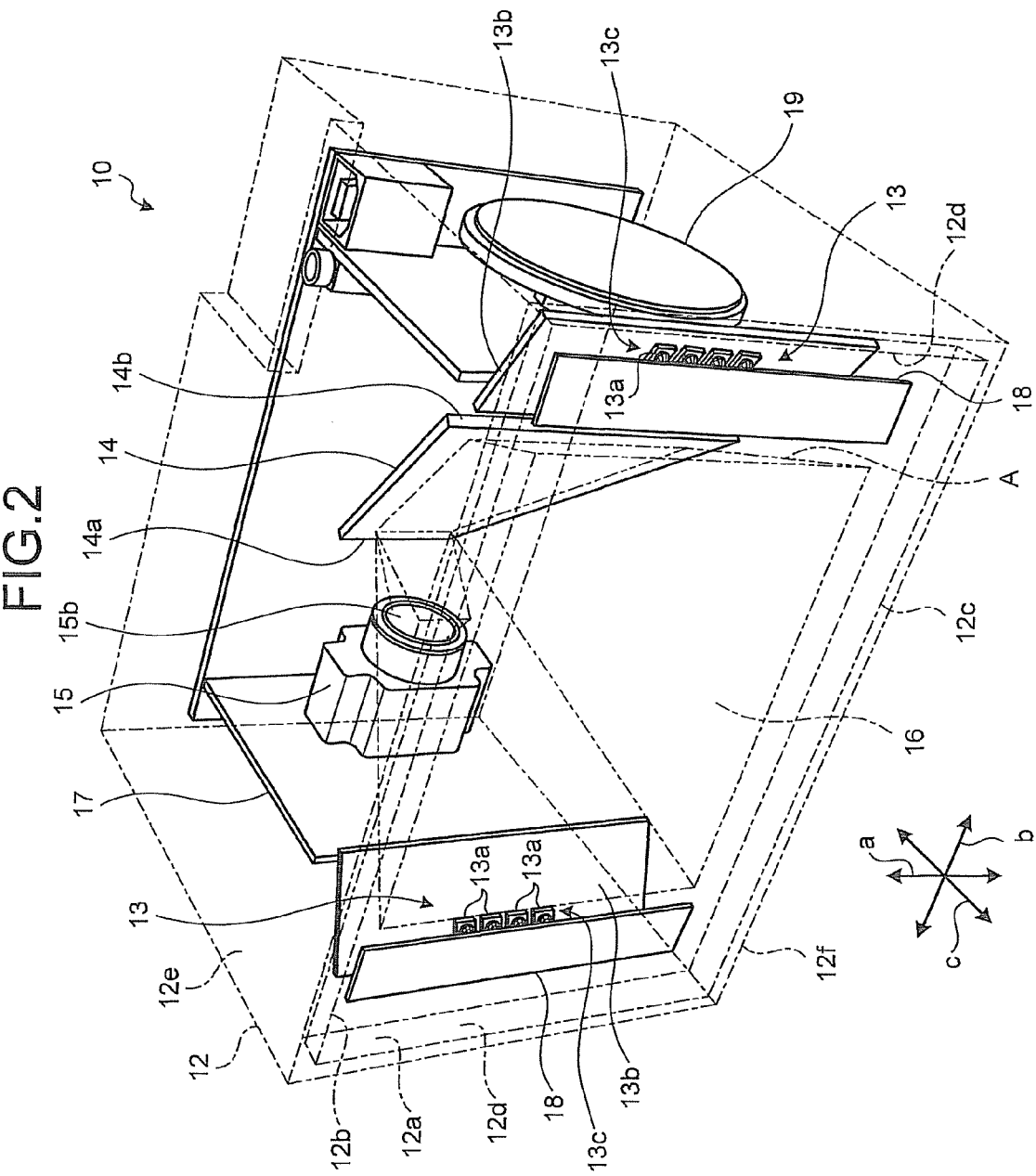
FIG. 2 is a transparent perspective view of the scanner according to the embodiment.
Figure 3:
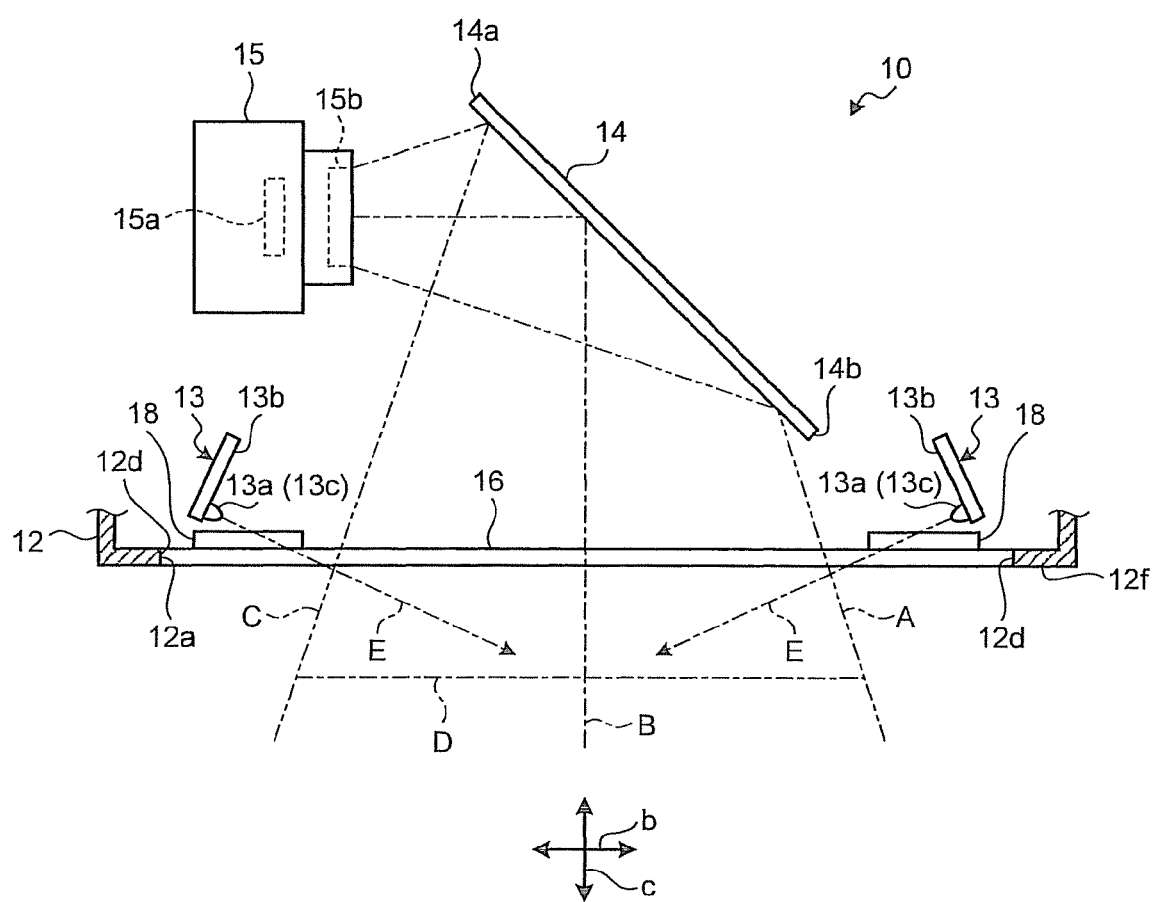
FIG. 3 is a horizontal sectional view of a main part of the scanner according to the embodiment.

As shown in FIGS. 2 and 3, the scanner main body 10 includes a housing 12 having the imaging window 12a in the front thereof. The scanner main body 10 includes, in the housing 12, an imaging device 15, a mirror 14, illuminating devices 13, and an image processing board 17 as code-symbol extracting means. The imaging device 15 includes a CCD (Charge Coupled Device) imaging device 15a as an image sensor. The mirror 14 bends an imaging area A of the imaging device 15. The illuminating devices 13 irradiate illumination light on the imaging area A of the imaging device 15. The image processing board 17 extracts a barcode as a code symbol from image data of a commodity acquired by the CCD imaging device 15a and acquires a commodity code. The image processing board 17 is mounted with, for example, a circuit that performs image processing. In FIGS. 2 and 3, the imaging area A of the imaging device 15 is schematically indicated by an alternate long and two short dashes line. In FIG. 2, a part including a portion on the outer side of the housing 12 in the imaging area A is omitted.

The housing 12 is formed in a rectangular parallelepiped box shape. The imaging window 12a is formed in a front wall 12f of the housing 12. The housing 12 faces an operator located in front forward of the housing 12. The imaging window 12a is sectioned by an upper side portion 12b as an upper end, a lower side portion 12c as a lower end, and a pair of side portions 12d as a pair of sides. The lower side portion 12c is located below the upper side portion 12b and spaced apart from the upper side portion 12b. The pair of side portions 12d connect respective ends of the upper side portion 12b and the lower side portion 12c and are spaced apart from each other. The imaging window 12a is formed in a square shape in front view. Specifically, the imaging window 12a is formed in a rectangular shape with the length of the upper side portion 12b and the lower side portion 12c set larger than the length of the pair of side sections 12d.

The imaging window 12a is closed by a plate 16. The plate 16 has transparency. The plate 16 is formed in a flat shape. The plate 16 is made of, for example, glass or resin.

The imaging device 15 picks up an image of an area around the imaging window 12a from the inner side of the housing 12 and outputs image data. Specifically, the imaging device 15 picks up an image of a reading area C via the imaging window 12a and outputs image data of a code symbol in the reading area C. The reading area C is an area on the outer side of the imaging window 12a facing the imaging window 12a and is an area in which a code symbol (a reading target) attached to a commodity is located. The imaging device 15 includes the CCD imaging device 15a, an imaging lens 15b, and a driving circuit (not shown) for the CCD imaging device 15a. The imaging lens 15b focuses an image of the imaging area A on the CCD imaging device 15a. The imaging device 15 is arranged in a position where the imaging device 15 receives reflected light from the code symbol as the reading target located in front (on the outer side) of the imaging window 12a, which is reflected light made incident in the housing 12 from the imaging window 12a. The imaging device 15 picks up an image of the code symbol. The imaging device 15 is arranged such that an optical axis of the imaging lens 15b extends along the left to right direction of the scanner 1. The mirror 14 is arranged in front of the imaging device 15. The mirror 14 is located at an angle with respect to the imaging window 12a. An imaging optical axis B of the imaging device 15 extends from the imaging device 15 to the mirror 14. The imaging optical axis B of the imaging device 15 is turned about 90 degrees by the mirror 14 and passes through the imaging window 12a.

A range in which the CCD imaging device 15a of the imaging device 15 can pick up an image is determined according to a characteristic of the imaging lens 15b. The imaging lens 15b in this embodiment is a fixed-focus lens. A focus position (a best-focused position) of the imaging lens 15b is present in a position a fixed distance apart from the distal end of the imaging lens 15b. Resolution is the highest when a commodity as an imaging object is placed in the focus position. An image of the commodity can be clearly picked up. As the commodity as the imaging object is placed in a direction coming closer from the focus position to the CCD imaging device and a direction further away from the CCD imaging device, an image becomes out of focus and the resolution falls. In order to decode a barcode, it is necessary to measure the widths of bars of colors (e.g., white and black) forming the barcode from image data of a commodity acquired by the CCD imaging device 15a. When an image is out of focus, the widths cannot be measured. Therefore, a range having resolution equal to or higher than fixed resolution in the imaging area A is the reading area C for the barcode in which the image processing board 17 can extract a code symbol from the image data. In FIG. 3, the reading area C is schematically shown. In this embodiment, the reading area C is schematically a range between a line D and the plate 16.

The illuminating devices 13 are respectively provided in the pair of side portions 12d of the imaging window 12a. In other words, the illuminating devices 13 are provided as a pair on the left and right. The illuminating devices 13 include light source units 13c as light sources and substrates 13b mounted with the light source units 13c. The pair of illuminating devices 13 are configured symmetrical (plane symmetrical).

Each of the light source units 13c includes plural LEDs (Light Emitting Diodes) 13a as light sources. The light source units 13c are not limited to the light source units each including the plural LEDs 13a and may be light source units each including a single LED 13a. The light source units 13c are located on the outer side of the reading area C. The light source units 13c are arranged along the side portions 12d of the housing 12. The light source units 13c irradiate illumination light on the reading area C. The LEDs 13a are arranged along the side portions 12d of the imaging window 12a on the outer side of the reading area C. As shown in FIG. 3, the LEDs 13a are arranged at an angle with respect to the imaging window 12a. More specifically, the LEDs 13a are arranged along the side portions 12d on the inside of the housing 12. In other words, the LEDs 13a are arranged in parallel to the side portions 12d of the imaging window 12a in a direction orthogonal to a direction in which the upper side portion 12b and the lower side portion 12c of the imaging window 12a are opposed to each other (i.e., the up to down direction) (i.e., the LEDs 13a are arranged in the horizontal direction). The LEDs 13a are arranged on sides of the imaging area A of the imaging device 15. In other words, the LEDs 13a are arranged on sides of the imaging area A located behind the imaging window 12a. The LEDs 13a irradiate illumination light on the reading area C located in front of the imaging window 12a from the sides of the imaging area A located behind the imaging window 12a. The LEDs 13a are opposed to each other in positions oblique to the plate 16 in the front to rear direction. The LEDs 13a are covered from above by an upper wall 12e of the housing 12 as a blocking member that blocks light. In each of the illuminating devices 13, the plural LEDs 13a are arranged along the side portion 12d of the imaging window 12a on the inside of the housing 12. The plural LEDs 13a are arranged closer to the center of the side portion 12d in the direction in which the upper side portion 12b and the lower side portion 12c of the imaging window 12a are opposed (i.e., the up to down direction). In other words, the light source unit 13c is arranged along the side portion 12d in the center of the side portion 12d of the imaging window 12a. The LEDs 13a are arranged in positions where optical axes E of the LEDs 13a do not enter the eyes of the operator facing the imaging window 12a. Specifically, the optical axes E of the LEDs 13a (i.e., optical axes of the light source units 13) are substantially orthogonal to the direction in which the upper side portion 12b and the lower side portion 12c of the imaging window 12a are opposed to each other.

Diffusers 18 are arranged in positions opposed to the LEDs 13a. The diffusers 18 are arranged in the imaging window 12a in front of the LEDs 13a. Specifically, the diffusers 18 are arranged to be opposed to each other in positions oblique to emission sides of illumination light in the LEDs 13a (the light source units 13c) on the outer side of the reading area C. The diffusers 18 are located on the imaging window 12a side of the housing 12. The diffusers 18 spread illumination light of the LEDs 13a, which passes through the diffusers 18, in a circular shape to thereby expand illumination areas of the LEDs 13a. The diffusers 18 are, for example, diffusing films. The diffusers 18 are fixedly attached to the inner surface of the plate 16. The diffusers 18, the illuminating devices 13, and the imaging device 15 are arranged on a straight line in the front to rear direction of the housing 12.

The mirror 14 reflects reflected light of illumination light from the light source units 13c, which illuminates the barcode in the reading area C, to the imaging device 15. The mirror 14 is located at an angle with respect to the imaging window 12a to reflect reflected light made incident from the imaging window 12a to the imaging device 15. The mirror 14 is formed in a trapezoidal shape with the length of the other side portion 14b on the opposite side of the imaging device 15 side set larger than the length of one side portion 14a on the imaging device 15 side.

The image processing board 17 is arranged on a side of the imaging device 15. The image processing board 17 is connected to the imaging device 15. The image processing board 17 recognizes one frame data, from which the entire barcode can be read, out of moving image data output from the imaging device 15. The image processing board 17 decodes the recognized barcode and outputs the barcode as decoded data.

The scanner main body 10 includes a speaker 19 in the housing 12. The speaker 19, the imaging device 15, and the mirror 14 are arranged in a row in the left to right direction.

A method of using the scanner 1 and the operation of the scanner 1 are explained below. In causing the scanner 1 to read a barcode of a commodity, the operator stands on the inner side of the sucker table 2 in front forward of the housing 12, i.e., a position facing the imaging window 12a. The operator takes out purchased commodities one by one from a shopping basket placed on the upstream side in a lane. When a barcode is attached to a commodity taken out from the shopping basket, the operator holds the barcode over the imaging window 12a of the scanner 1 within the reading area C and causes the imaging device 15 to read the barcode. In this case, the LEDs 13a illuminate the reading area C.

In the scanner 1, the imaging device 15 sends image data of an image of the commodity picked up by the imaging device 15 to the image processing board 17. Subsequently, the image processing board 17 extracts an image of the barcode and analyzes the image. An analyzed commodity code is output to a host apparatus such as a POS terminal, whereby commodity registration is performed.

When the barcode is accurately read, the speaker 19 of the scanner main body 10 emits confirmation sound indicating the end of the reading. The operator hears the confirmation sound and puts the commodity in a shopping basket arranged downstream in the lane.

As explained above, in the scanner 1 according to this embodiment, the LEDs 13a (the light source units 13c) are arranged along the side portions 12d of the imaging window 12a and irradiate illumination light on the reading area C. Therefore, when the imaging window 12a is arranged in a position lower than the eyes of the operator facing the imaging window 12a, the illumination light of the LEDs 13a tends to enter the eyes of the operator compared with structure in which LEDs are arranged in the lower side portion 12c of an imaging window. Therefore, with the scanner 1 according to this embodiment, it is possible to suppress the scanner 1 from dazzling the operator.

In the scanner 1 according to this embodiment, the diffusers 18 are arranged to be opposed to the LEDs 13a and diffuse illumination light of the LEDs 13a. Therefore, even when the operator directly looks at the LEDs 13a during scan work, it is possible to suppress the scanner 1 from dazzling the operator.

In the scanner 1 according to this embodiment, the mirror 14 is arranged on the inside of the housing 12 and reflects reflected light from a barcode to the imaging device 15. Therefore, in securing a long imaging distance to secure a wide imaging range, it is possible to realize a reduction in thickness in the front to rear direction of the scanner 1 compared with structure in which a mirror is not provided and an imaging device and an imaging window are arranged on a straight line.

In the scanner 1 according to this embodiment, the mirror 14 is formed in a trapezoidal shape with the length of the other side portion 14b on the opposite side of the imaging device 15 side set larger than the length of one side portion 14a on the imaging device 15 side. Therefore, there is an advantage that an amount of a material of the mirror 14 may be small compared with a mirror, one side portion of which has the same length as the other side portion.

In the scanner 1 according to this embodiment, the imaging window 12a is formed in a rectangular shape with the length of the upper side portion 12b and the lower side portion 12c set larger than the length of the pair of side portions 12d. In other words, the imaging window 12a is formed in a laterally long rectangular shape long in the left to right direction. The LEDs 13a are arranged along the side portions 12d of the imaging window 12a on the inside of the housing 12. Therefore, there is an advantage that an illumination range in the up to down direction of the LEDs 13a may be narrow compared with structure in which an imaging window is formed in a longitudinally long rectangular shape long in the up to down direction.

In the scanner 1 according to this embodiment, each of the light source units 13c includes the plural LEDs 13a and is arranged along the side portion 12d of the imaging window 12a in the center of the side portion 12d. Therefore, it is possible to efficiently illuminate the reading area C with a relatively small number of the LEDs 13a. If LEDs are equally arrayed in the up to down direction in a side portion of an imaging window, a part of illumination light of the LEDs located at upper and lower ends in a row of the LEDs illuminates the outside of the reading area C without illuminating the reading area C.

In the scanner 1 according to this embodiment, the LEDs 13a are provided on the inside of the housing 12, located behind the imaging window 12a, and opposed to the plate 16. Therefore, even in a state in which a barcode is pressed against the plate 16, since illumination light of the LEDs 13a is irradiated on the barcode, the scanner 1 can satisfactorily pick up an image of the barcode and read the barcode.

The present invention is not limited to this embodiment. Various other embodiments can be adopted without departing from the spirit of the present invention. For example, in this embodiment, the barcode is applied as the code symbol. However, the present invention is not limited to this. Various code symbols such as a two-dimensional code can be applied.

In this embodiment, the LEDs are applied as the light sources. However, the present invention is not limited to this. Various light sources such as fluorescent lamps can be applied.

In the example explained in this embodiment, the light sources are arranged on the inside of the housing. However, the present invention is not limited to this. The light sources may be arranged on the outside of the housing.

In this embodiment, the rectangular imaging window formed in a square shape in front view is explained as the example. However, the present invention is not limited to this. The imaging window may be formed in, for example, a pentagonal shape, a hexagonal shape, or the like in front view.

As explained above, according to this embodiment, when the imaging window is arranged in a position lower than the eyes of the operator facing the imaging window in the scanner, it is possible to suppress the scanner from dazzling the operator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A scanner comprising:
a housing having an imaging window sectioned by an upper side portion, a lower side portion spaced apart from the upper side portion, and a pair of side portions that connect respective ends of the upper side portion and the lower side portion;
an imaging device provided in the housing and configured to pick up, via the imaging window, an image of a reading target present in a reading area formed on an outer side of the housing through the imaging window and output image data of the reading target; and
a light source located on an outer side of the reading area, arranged along at least one of the side portions of the housing, and configured to irradiate illumination light on the reading area, an optical axis of the light source being arranged at an oblique angle with respect to the imaging window.

2. The scanner according to claim 1, further comprising a diffuser arranged to be opposed to an emission side of the illumination light of the light source, located on the imaging window side of the housing, and configured to diffuse the illumination light of the light source.

3. The scanner according to claim 2, wherein
the diffuser is arranged in the imaging window.

4. The scanner according to claim 1, further comprising a mirror arranged on an inside of the housing and configured to reflect reflected light of the illumination light from the light source, which illuminates the reading target present in the reading area, to the imaging device.

5. The scanner according to claim 4, wherein the mirror is located at an angle with respect to the imaging window to reflect the reflected light made incident from the imaging window to the imaging device and formed in a trapezoidal shape with length of the other side portion on an opposite side of the imaging device side set larger than length of one side portion on the imaging device side.

6. The scanner according to claim 1, wherein the light source includes plural light sources, and are arranged along the at least one of the side portions on an inside of the housing.

7. The scanner according to claim 6, wherein the light sources are arranged in parallel along each of the side portions.

8. The scanner according to claim 1, wherein the imaging window is formed in a rectangular shape with length of the upper side portion and the lower side portion set larger than length of the pair of side portions.

9. The scanner according to claim 1, wherein the light source includes plural light sources and are arranged along the at least on of the side portions of the imaging window in a center of the side portion.

10. The scanner according to claim 9, wherein the light sources are arranged parallel along each of the side portions.

11. The scanner according to claim 1, wherein the reading target is a code symbol attached to a commodity.

12. The scanner according to claim 1, wherein the optical axis of the light source is substantially orthogonal to a direction in which the upper side portion and the lower side portion are opposed to each other.

* * * * *